(12) United States Patent
Gill

(10) Patent No.: US 11,954,983 B1
(45) Date of Patent: Apr. 9, 2024

(54) RECYCLED GOLF BALL VENDING MACHINE SYSTEM AND METHOD OF SALES

(71) Applicant: Taylor Gill, Albany, LA (US)

(72) Inventor: Taylor Gill, Albany, LA (US)

(*) Notice: Subject to any disclaimer, the term of this patent is extended or adjusted under 35 U.S.C. 154(b) by 0 days.

(21) Appl. No.: 17/234,961

(22) Filed: Apr. 20, 2021

(51) Int. Cl.
*G07F 17/38* (2006.01)
*A63B 47/00* (2006.01)
*G07F 11/24* (2006.01)
*G07F 11/32* (2006.01)

(52) U.S. Cl.
CPC ............ *G07F 17/38* (2013.01); *A63B 47/002* (2013.01); *G07F 11/24* (2013.01); *G07F 11/32* (2013.01); *A63B 2225/70* (2013.01)

(58) Field of Classification Search
CPC ....................................................... G07F 17/38
See application file for complete search history.

(56) References Cited

U.S. PATENT DOCUMENTS

| | | | |
|---|---|---|---|
| 3,946,847 A | 3/1976 | Bock | |
| 4,054,197 A | 10/1977 | Bock | |
| 4,126,217 A | 11/1978 | Bock | |
| 4,588,108 A | 5/1986 | Knez et al. | |
| 4,667,847 A | 5/1987 | Tucom | |
| 5,009,330 A * | 4/1991 | Young | G07F 11/44 221/265 |
| 5,277,331 A * | 1/1994 | Barbaccia | A63B 47/002 221/68 |
| 5,566,806 A * | 10/1996 | Reale | G07F 11/34 194/215 |
| 5,901,878 A | 5/1999 | Tyson, III | |
| 6,006,945 A | 12/1999 | Kirkland | |
| 6,885,998 B1 | 4/2005 | Arduino | |
| 8,550,293 B2 * | 10/2013 | Garson | G07F 11/32 211/59.3 |
| 10,614,651 B1 | 4/2020 | Knight | |
| 2011/0315706 A1 * | 12/2011 | Lockwood | G07G 3/003 221/155 |

(Continued)

*Primary Examiner* — Gene O Crawford
*Assistant Examiner* — Ayodeji T Ojofeitimi
(74) *Attorney, Agent, or Firm* — Norton IP Law Firm LLC; Taylor M. Norton

(57) ABSTRACT

The present disclosure provides for a recycled golf ball vending machine having a housing with a bottom retrieval chamber and a plurality of shelves disposed above the retrieval chamber. Each shelf includes at least a single coiled wire and at least two opposing coiled wires. The recycled golf ball vending machine includes at least a first transparent cylindrical container having a plurality of recycled golf balls positioned upright within the single coiled wire. The recycled golf ball vending machine further includes a first transparent clamshell container having a first predetermined number of recycled golf balls positioned between the two opposing coiled wires. A payment mechanism activates an instruction mechanism upon a receipt of a payment by a user, which in turn rotates the single coiled wire or the at least two coiled wires. The rotation of the single coiled wire or the two coiled wires respectively conveys the first transparent cylindrical container or the first transparent clamshell container horizontally along the shelf until it slides over a front edge of the shelf and drops into the retrieval chamber.

24 Claims, 12 Drawing Sheets

(56) References Cited

U.S. PATENT DOCUMENTS

2013/0037562 A1\* 2/2013 Close ................. A47F 1/126
206/774
2014/0299620 A1\* 10/2014 Swafford, Jr. .......... A47F 1/126
221/4

\* cited by examiner

RECYCLED GOLF BALL VENDING MACHINE SYSTEM AND METHOD OF SALES

BACKGROUND OF THE INVENTION

Field of the Invention

The present invention generally pertains to golf equipment vending dispensers and more particularly pertains to financial vending devices for golf balls.

Description of the Related Art

After having been used on driving ranges and golf courses, golf balls are generally disposed of as industrial waste. The amount of industrial waste is growing at an alarming rate, and it is difficult to dispose of used golf balls from the viewpoint of the environment. Therefore, it is desired that used golf balls be reclaimed or recycled. In the used golf ball, dimples on the surface are shallow due to abrasion, and various markings are present due to scuffings. Conventional sales of recycled golf balls is undertaken through internet sales. However, Golfers are not able to precisely ascertain the brand, color, quality and condition of the recycled golf ball when making such purchases online, and the shipping of such purchased golf balls prevents any immediate use of the purchased balls by a golfer, on the golf course or at a driving range. Therefore, a need exists for unique and improved devices and methods for the sales of recycled golf balls that allow golfers to better know and choose the brands, colors, qualities and conditions of the recycled golf balls as well as allow immediate use by golfers of the purchased golf balls.

The range of available methods of sales of recycled golf balls through internet sales are vast and vary depending upon the computer or smart cell phone technology of the purchasing golfers. A need exists for devices and methods of sales of recycled golf balls that are not dependent on technology or sophistication of the purchasing golfers.

Although some improvements to technologies have increased the availability of sports equipment to individuals in the general public generally, a need exists for devices, systems and methods of sales of recycled golf balls that will help further increase the availability and convenience of use for the general public.

While conventional devices and methods may be suitable for the particular purposes employed, they would not be as suitable for the purposes of the present invention as disclosed hereafter. None of such conventional devices disclose the unique structures and advantages of the present disclosure.

Accordingly, there is a need for vending machine systems, methods and devices that will significantly increase the availability, options and convenience of use for the golfer to purchase recycled golf balls, where such devices are quickly accessible and convenient to use.

As disclosed in this application, the inventor has discovered novel and unique devices and methods for efficiently and effectively providing recycled golf balls to golfers.

The devices and methods disclosed herein avoid many of the drawbacks of existing methods and devices.

Embodiments of the present invention provide for recycled golf balls vending machine devices, systems and methods for selling recycled golf balls as described and defined in the description below and in the annexed claims which provide for improved efficiency and effectiveness characteristics in order to conveniently and more efficiently sell recycled golf balls, in a multitude of environments.

SUMMARY OF THE INVENTION

It is one prospect of the present invention to provide a novel recycled golf ball vending machine of simple but effective construction for convenient and efficient distribution and sales of recycled golf balls to the general public.

The following presents a simplified summary of the present disclosure in a simplified form as a prelude to the more detailed description that is presented herein.

Therefore, in accordance with embodiments of the invention, there is provided a recycled golf ball vending machine, which includes an upstanding vending machine having a housing including a bottom retrieval chamber. The housing includes a front transparent display window. The upstanding vending machine includes a plurality of shelves disposed above the retrieval chamber within the housing. Preferably, each shelf of the plurality of shelves comprises at least two opposing coiled wires disposed above each shelf. Each coiled wire of the at least two opposing coiled wires has a respective horizontal axis around which the respective coiled wire is adapted to rotate at the option of a user. In yet another preferred embodiment, each shelf of the plurality of shelves comprises at least a single coiled wire adapted to rotate about a central axis at the option of the user to horizontally slide a cylindrical container off of the respective shelf into the retrieval chamber.

In one embodiment, the recycled golf ball vending machine includes a first transparent clamshell container having a first predetermined number of recycled golf balls. The first clamshell container is positioned between the at least two opposing coiled wires of a first shelf of the plurality of shelves. The first predetermined number of recycled golf balls includes a first plurality of different brands of recycled golf balls, and the different brands are selectable at the option of the user.

In another embodiment, the recycled golf ball vending machine includes a second transparent clamshell container having a second predetermined number of recycled golf balls. Preferably, the second clamshell container positioned between the at least two coiled opposing wires of a second shelf of the plurality of shelves, and the second predetermined number of recycled golf balls is less than the first predetermined number of recycled golf balls.

In a preferred embodiment, the first transparent clamshell container packaging is preferably a clear plastic square hinged container. Preferably, the clamshell container has a cover portion and a tray portion connected by a hinge.

In one embodiment, the recycled golf ball vending machine includes a payment mechanism in electronic communication with an instruction mechanism. In one embodiment, the instruction mechanism is in electronic communication with the at least two coiled wires. The instruction mechanism is also in electronic communication with the at least single coiled wire. The payment mechanism is adapted to activate the instruction mechanism upon a receipt of a payment by a user. The instruction mechanism is adapted to rotate the at least two coiled wires upon a receipt of an instruction by a user, such that the rotation conveys the first transparent clamshell container or the second clamshell container, at the instruction of the user, horizontally along the respective first shelf or second shelf until said first transparent clamshell container or said second clamshell container slides over a front edge of the respective first shelf or second shelf and drops into the retrieval chamber.

In another embodiment, the recycled golf ball vending machine further includes at least a first cylindrical container having a transparent cylindrical wall. The at least first cylindrical container contains a third predetermined number of recycled golf balls within the transparent cylindrical wall. In one embodiment, the at least first cylindrical container is oriented upright between the at least two coiled opposing wires atop a third shelf of the plurality of shelves. A rotation of the two opposing coiled wires at the option of the user horizontally slides the at least first cylindrical container off the third shelf into the retrieval chamber. In another embodiment, the at least first cylindrical container is oriented upright between the at least single coiled wire atop a third shelf of the plurality of shelves, and rotation of the at least single coiled wire at the option of the user horizontally slides the at least first cylindrical container off the third shelf into the retrieval chamber.

In another embodiment, the at least first cylindrical container contains a first plurality of golf tees within the transparent cylindrical wall.

In a preferred embodiment, the third predetermined number of recycled golf balls includes a first mix of different grades of condition of recycled golf balls.

In one embodiment, the third predetermined number of recycled golf balls includes a second plurality of different brands of recycled golf balls. The transparent cylindrical wall displays the second plurality of different brands of recycled golf balls adapted for selection by a user.

In another embodiment, the recycled golf ball vending machine includes at least a second cylindrical container having a transparent cylindrical wall. The at least second cylindrical container contains a fourth predetermined number of recycled golf balls within the transparent cylindrical wall. The fourth predetermined number of recycled golf balls is less than the third predetermined number of recycled golf balls. Further, the at least second cylindrical container is oriented upright between the at least two coiled opposing wires atop the third shelf of the plurality of shelves. A rotation of the two opposing coiled wires at the option of the user horizontally slides said at least second cylindrical container off the third shelf into the retrieval chamber. In another embodiment, the at least second cylindrical container is oriented upright between the at least single coiled wire atop the third shelf of the plurality of shelves, and rotation of the at least single coiled wire at the option of the user horizontally slides said at least second cylindrical container off the third shelf into the retrieval chamber.

In a preferred embodiment, third shelf has a first displayed price associated with the payment for the at least first cylindrical container, and a second displayed price associated with the payment for the at least second cylindrical container. The first displayed price has a financial value higher than the second displayed price.

In one embodiment, the recycled golf ball vending machine includes a third transparent clamshell container having the first predetermined number of recycled golf balls. The recycled golf balls of the first transparent clamshell are in better condition than the recycled golf balls of the third transparent clamshell container. Further, the first shelf has a first displayed price associated with the payment for the third transparent clamshell container, and a second displayed price associated with the payment for the third transparent clamshell container. The first displayed price has a financial value higher than the second displayed price.

In another embodiment, the first plurality of different brands of recycled golf balls is different from the second plurality of different brands of recycled golf balls.

In a preferred embodiment, the at least first cylindrical container stands upright the first plurality of recycled golf balls. The first plurality of recycled golf balls preferably includes a first mix of different grade conditions of recycled golf balls. The transparent cylindrical wall displays the first mix of different grade conditions of recycled golf balls and is adapted for selection by a user, which the user can select using the payment mechanism and connected instruction mechanism.

In accordance with embodiments of the invention, there is provided a recycled golf ball vending system for selling golf equipment to users at a plurality of locations. The recycled golf ball vending system includes a first recycled golf ball vending machine and a second recycled golf vending machine located remote from the first recycled golf ball vending machine.

In one embodiment, the first recycled golf ball vending machine includes a housing having a front transparent display window and a first pair of opposing coiled wires positioned above a first shelf disposed within the housing and is adapted for receiving, storing, and dispensing a first plurality of recycled golf balls from within the first recycled golf ball vending machine.

In another embodiment, the first recycled golf ball vending machine contains at least a first cylindrical container having a transparent cylindrical wall. The at least first cylindrical container is stored atop the first shelf and contains the first plurality of recycled golf balls. The first recycled golf ball vending machine also includes a first payment mechanism in electronic communication a first instruction mechanism. The first instruction mechanism is in electronic communication with the first pair of opposing coiled wires adapted such that a receipt of payment and instruction by a user activates the first pair of opposing coiled wires to rotate. The rotation of the first pair of opposing coiled wires conveys the at least first cylindrical container over a front edge of the first shelf to dispense the first plurality of recycled golf balls.

In one embodiment, the second recycled golf ball vending machine includes a housing having a front transparent display window and a second pair of opposing coiled wires positioned above a second shelf disposed within the housing and is adapted for receiving, storing, and dispensing a second plurality of recycled golf balls from within the second recycled golf ball vending machine.

In one embodiment, the second recycled golf ball vending machine contains at least a second cylindrical container having a transparent cylindrical wall. The at least second cylindrical container is stored atop the second shelf and contains the second plurality of recycled golf balls. The second recycled golf ball vending machine also includes a second payment mechanism in electronic communication a second instruction mechanism. The second instruction mechanism is in electronic communication with the second pair of opposing coiled wires adapted such that a receipt of payment and instruction by a user activates the second pair of opposing coiled wires to rotate. The rotation of the second pair of opposing coiled wires conveys the at least second cylindrical container over a front edge of the second shelf to dispense the second plurality of recycled golf balls.

In another embodiment, the at least first cylindrical container contains a first plurality of golf tees within the transparent cylindrical wall.

In a preferred embodiment, the at least first cylindrical container contains a pair of sunglasses within the transparent cylindrical wall.

In one embodiment, the at least first cylindrical container stands upright the first plurality of recycled golf balls. The first plurality of recycled golf balls comprises a first mix of different brands of recycled golf balls. Also, the transparent cylindrical wall displays the first mix of different brands of recycled golf balls adapted for selection by the user.

In another embodiment, the at least first cylindrical container stands upright the first plurality of recycled golf balls. The first plurality of recycled golf balls comprises a first mix of different grades of condition of recycled golf balls, and the transparent cylindrical wall displays the first mix of different grades of condition of recycled golf balls, which can be selected by instruction the user.

In accordance with embodiments of the invention, there is provided a method of selling golf balls. The method includes providing at least one transparent clamshell container sized in dimension and configured to contain a plurality of golf balls and providing a first plurality of recycled golf balls. The first plurality of recycled golf balls is disposed within the at least one transparent clamshell container. The method also includes providing at least one vending machine configured to vend the at least one transparent clamshell container containing the first plurality of recycled golf balls.

In one embodiment, the at least one vending machine includes a housing having a bottom retrieval chamber and a plurality of shelves disposed above the retrieval chamber within the housing. The at least one shelf of the plurality of shelves includes at least two opposing coiled wires configured to rotate at the option of a user. A rotation of the at least two opposing coiled wires at the option of the user conveys the at least one transparent clamshell container horizontally along the at least one shelf until the at least one transparent clamshell container slides over a front edge of the at least one shelf and drops into the retrieval chamber. The at least one vending machine is loaded with the at least one transparent clamshell container containing the first plurality of recycled golf balls.

In one embodiment, the method also includes vending selectively from the vending machine the at least one transparent clamshell container having the first plurality of recycled golf balls.

In another embodiment, the step of providing the first plurality of recycled golf balls includes providing a first mix of different brands of recycled golf balls.

In yet another embodiment, the method of selling golf balls also includes a step of providing at least one cylindrical container having a transparent cylindrical wall. The method further includes a step of providing a second plurality of recycled golf balls disposed within the transparent cylindrical wall of the at least one cylindrical container. The at least one transparent cylindrical container is positioned atop the at least one shelf of the plurality of shelves. The at least one transparent cylindrical container is positioned between the at least two opposing coiled wires. A rotation of the at least two opposing coiled wires, selected at the option of the user, conveys the at least one transparent cylindrical container horizontally along the at least one shelf until the at least one transparent cylindrical slides over a front edge of the at least one shelf and drops into the retrieval chamber.

In a preferred embodiment, the step of providing a second plurality of recycled golf balls includes providing a second mix of different brands of recycled golf balls.

In one embodiment, the step of providing a first plurality of recycled golf balls includes a first step of retrieving a plurality of used golf balls from a pond and includes a second step of washing said plurality of used golf balls.

In another embodiment, the step of providing a first plurality of recycled golf balls includes a first step of retrieving a plurality of used golf balls from a pond and includes a second step of washing said plurality of used golf balls. The step also includes a third step of sorting the plurality of used golf balls according to manufacturer, and includes a fourth step of sorting the plurality of used golf balls according to quality.

In yet another embodiment, the step of providing at least one vending machine configured to vend the at least one transparent clamshell container containing the first plurality of recycled golf balls includes installing the at least one vending machine at a retail establishment. The at least one vending machine is adapted for commercial sales of recycled golf balls to the public.

In one embodiment, the step of providing at least one vending machine configured to vend the at least one transparent clamshell container containing said recycled golf balls includes installing the at least one vending machine at a public golf course. The at least one vending machine is adapted for commercial sales of recycled golf balls to the public.

These and other features, aspects, and advantages of the present invention will become better understood with reference to the following description and appended claims.

BRIEF DESCRIPTION OF THE DRAWINGS

Illustrative embodiments of the present invention are described herein with reference to the accompanying drawings, in which.

DETAILED DESCRIPTION

Figure 1:
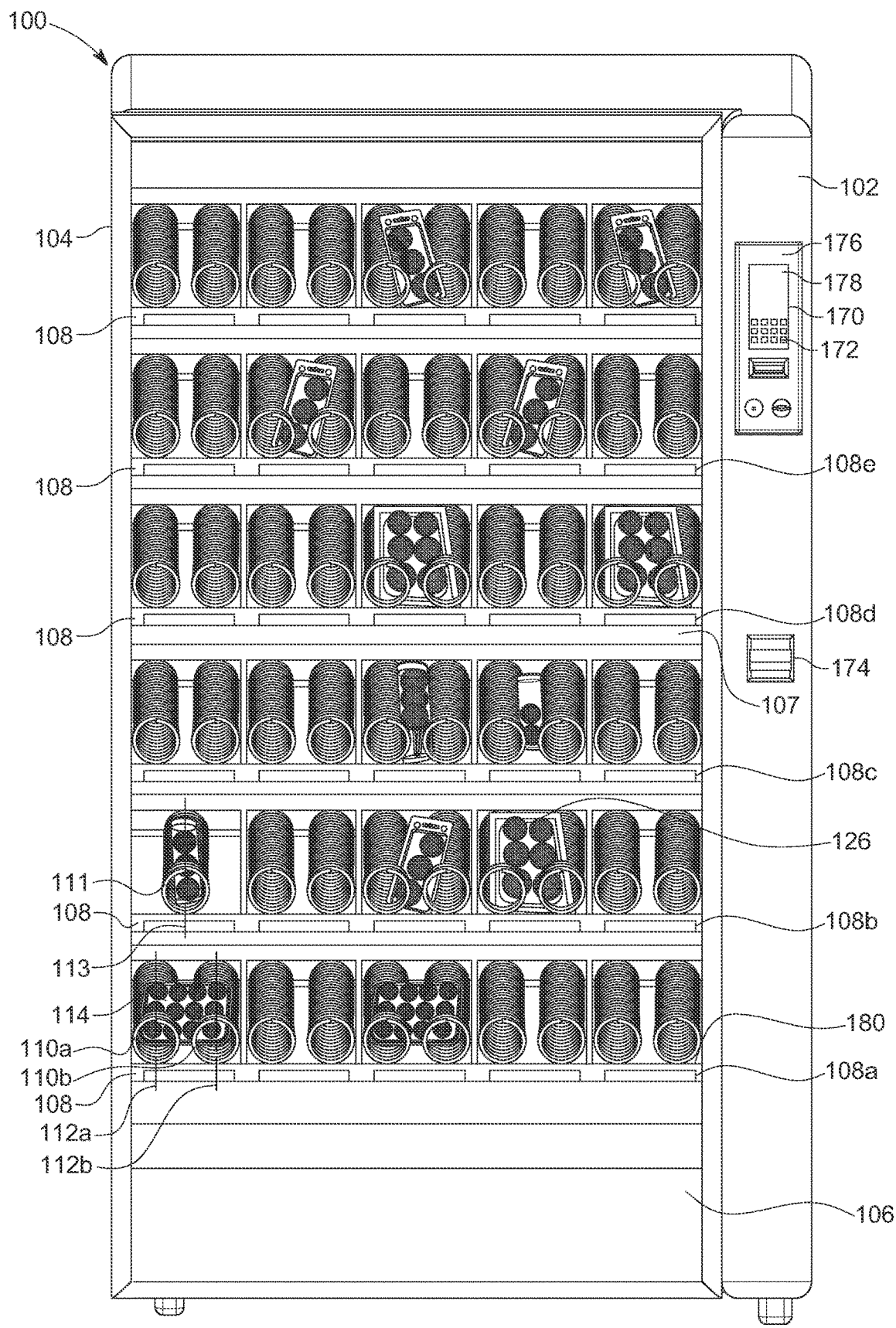
FIG. 1 is front partially perspective view of an exemplary recycled golf ball vending machine, in accordance with embodiments of the invention.

For a further understanding of the nature and function of the embodiments, reference should be made to the following detailed description. Detailed descriptions of the embodiments are provided herein, as well as, the best mode of carrying out and employing the present invention. It will be readily appreciated that the embodiments are well adapted to carry out and obtain the ends and features mentioned as well as those inherent herein. It is to be understood, however, that the present invention may be embodied in various forms. Therefore, persons of ordinary skill in the art will realize that the following disclosure is illustrative only and not in any way limiting, as the specific details disclosed herein provide a basis for the claims and a representative basis for teaching to employ the present invention in virtually any appropriately detailed system, structure or manner. It should be understood that the devices, materials, methods, procedures, and techniques described herein are presently representative of various embodiments. Other embodiments of the disclosure will readily suggest themselves to such skilled persons having the benefit of this disclosure.

Reference will now be made in detail to the present preferred embodiments of the invention, examples of which are illustrated in the accompanying drawings. Wherever possible, the same reference numerals are used in the drawings and the description to refer to the same or like parts.

Figure 2:
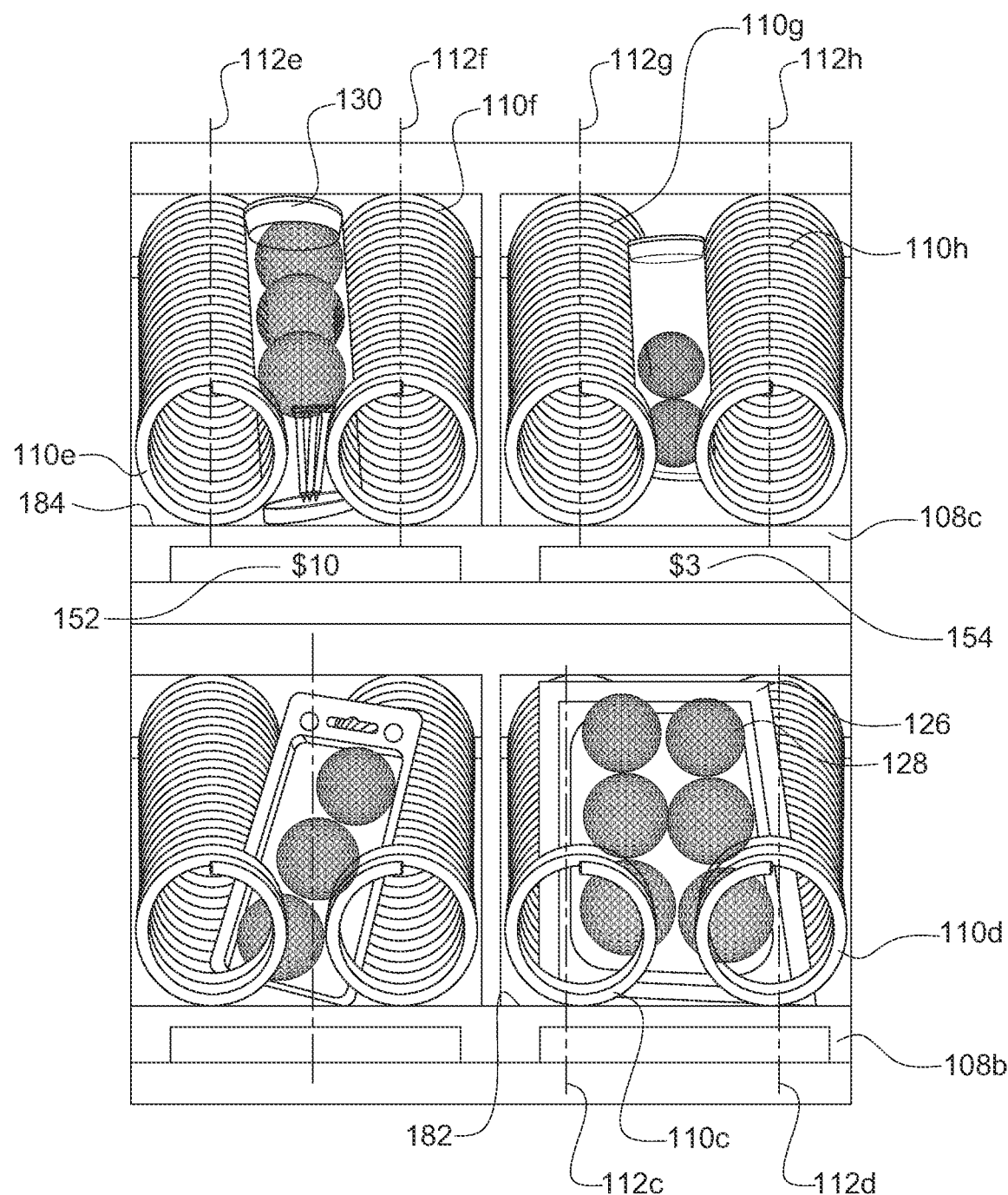
FIG. 2 is an enlarged front partially perspective view of a portion of an exemplary second shelf and an exemplary third shelf of the recycled golf vending machine, in accordance with embodiments of the invention.
Figure 3:
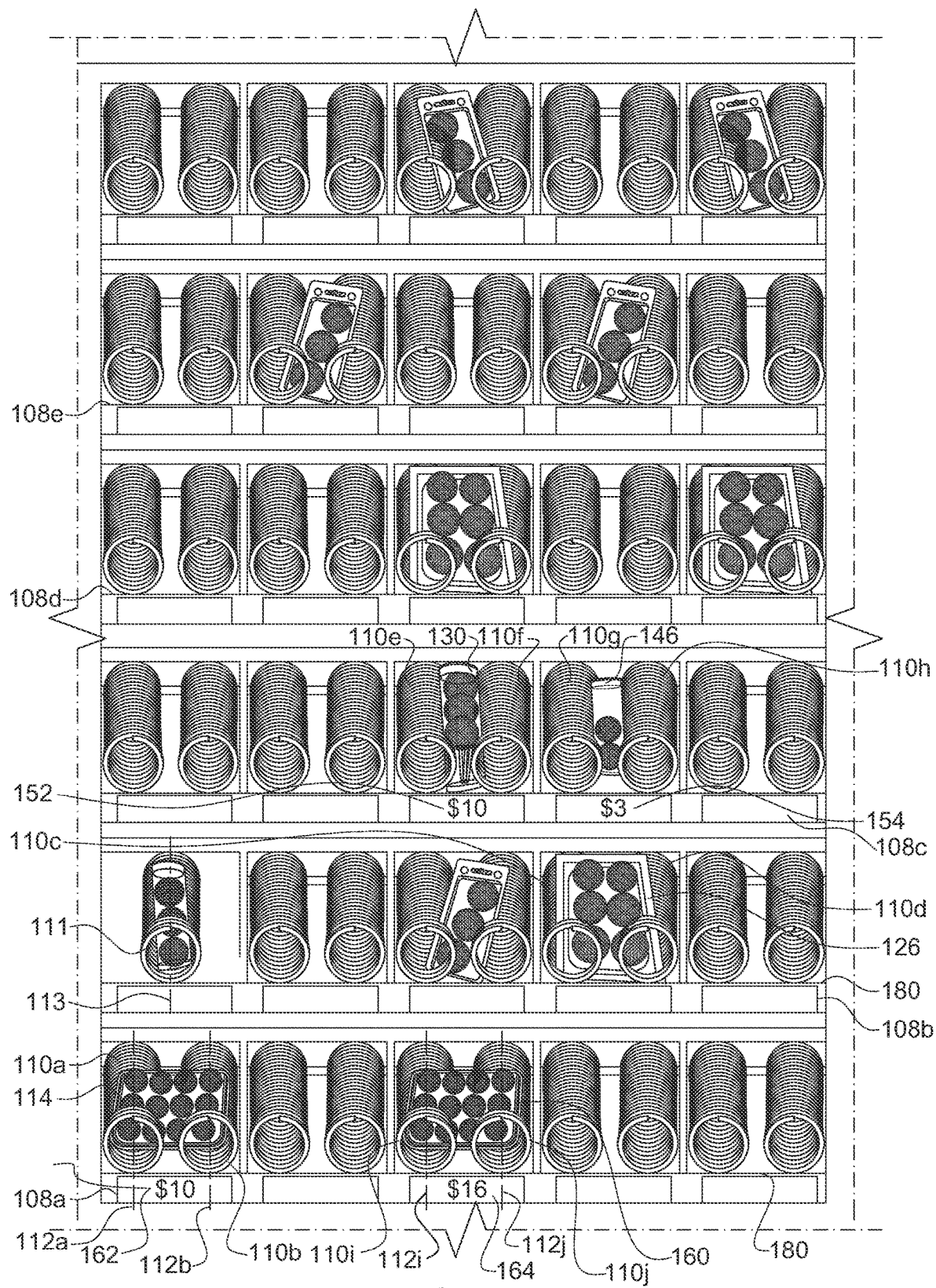
FIG. 3 is an front partially perspective view of the recycled golf ball vending machine, in accordance with embodiments of the invention.

Referring initially to FIGS. 1-3, the basic constructional details and principles of operation of embodiments of a recycled golf ball vending machine 100 are provided.

As illustrated in FIG. 1, in a preferred embodiment, the disclosed recycled golf ball vending machine 100 includes an upstanding vending machine 102 having a housing 104 that includes a bottom retrieval chamber 106. The housing 104 includes a front transparent display window 107. The upstanding vending machine 102 comprises a plurality of shelves 108 (e.g., 108a, 108b, 108c, 108d, 108e) disposed above said retrieval chamber 106 within the housing 104. Each shelf 108a, 108b, 108c, 108d, 108e of the plurality of shelves 108 comprises at least two opposing coiled wires, such as 110a, 110b, disposed above each shelf 108a, 108b, 108c, 108d, 108e. Each coiled wire 110a, 110b of the at least two opposing coiled wires 110a, 110b has a respective horizontal axis 112a, 112b around which the respective coiled wire 110a, 110b is adapted to rotate at the option of a user.

Figure 4:
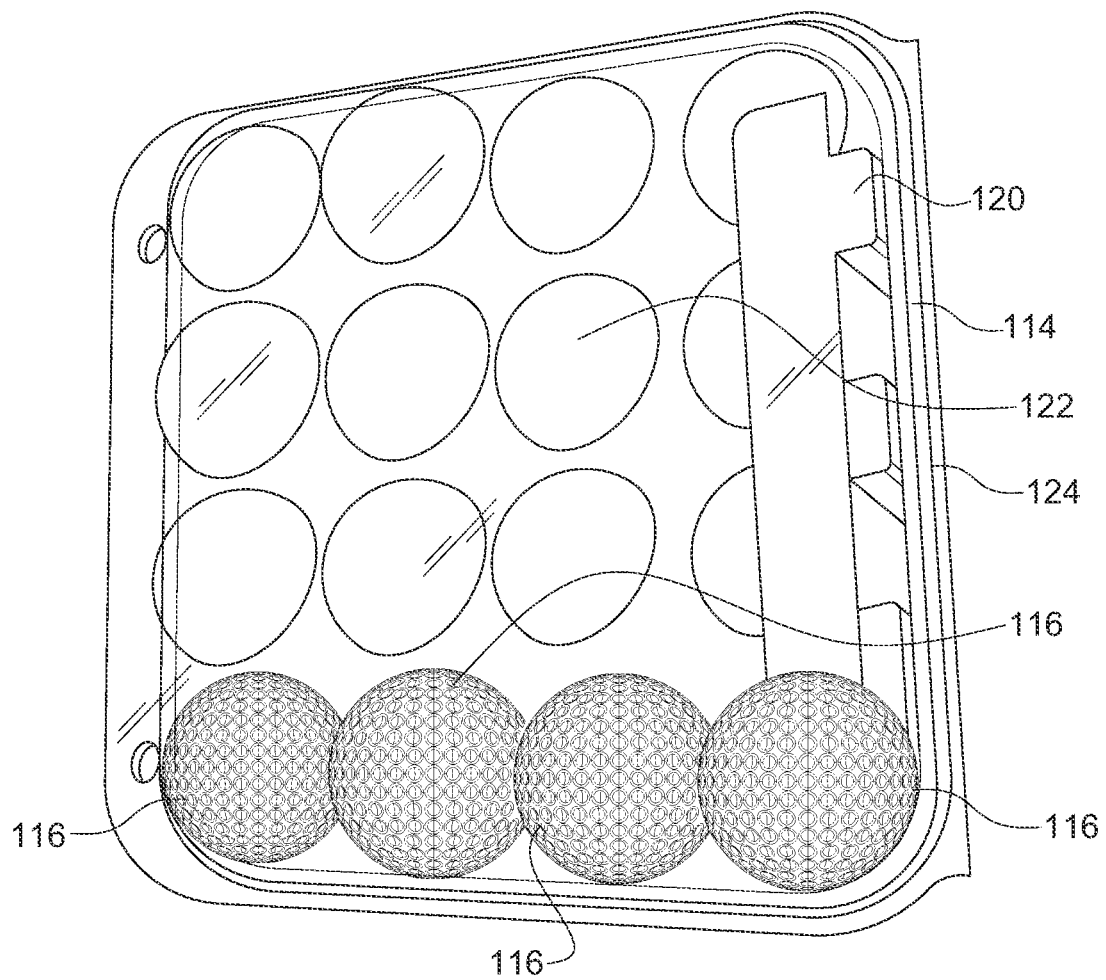
FIG. 4 is a perspective view of a first transparent clamshell container, in accordance with embodiments of the invention.
Figure 5:
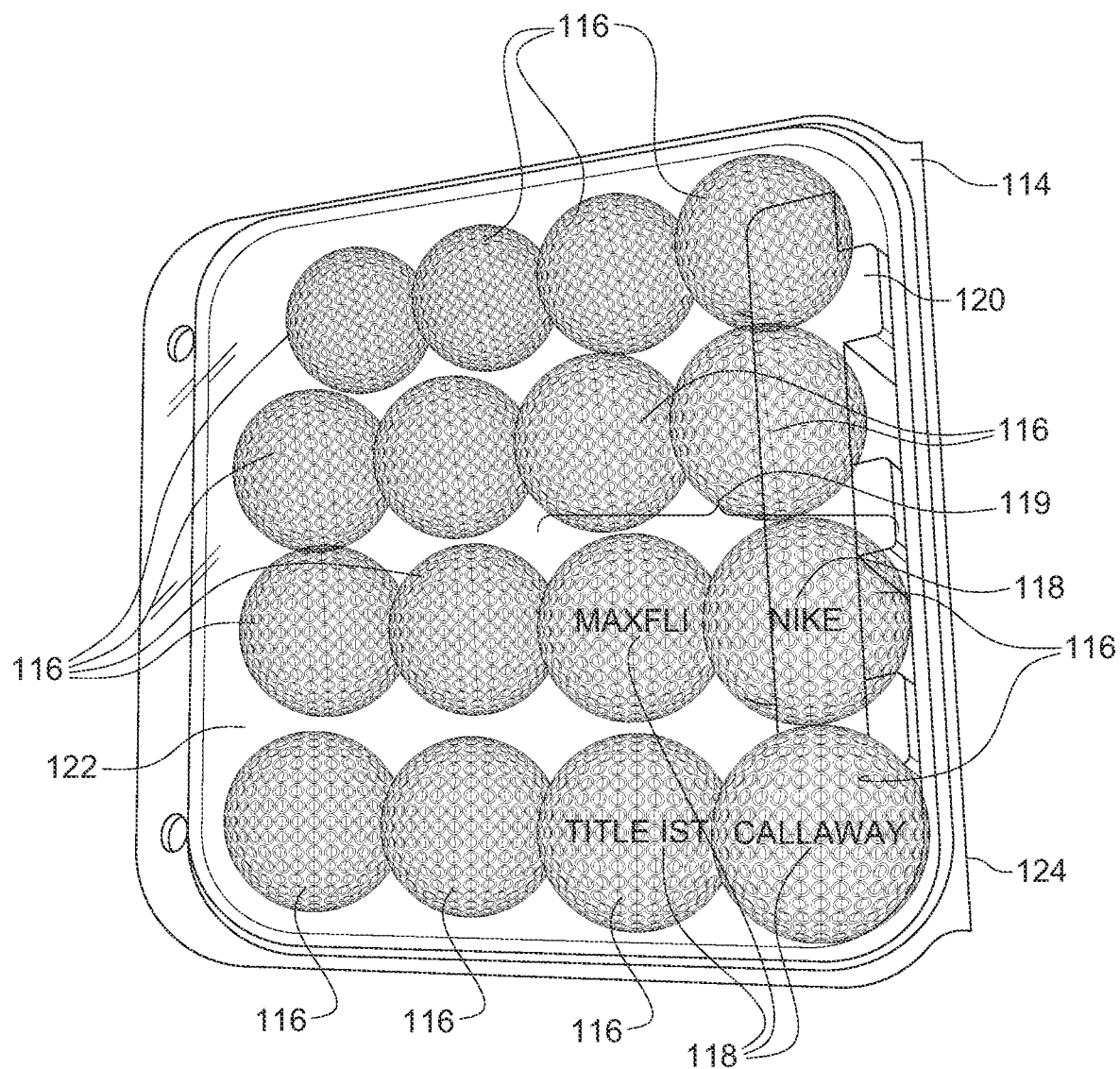
FIG. 5 is perspective view of the first transparent clamshell container with a first predetermined number of recycled golf balls arranged inside the first transparent clamshell container, in accordance with embodiments of the invention.

Preferably, referring to FIGS. 1-5, the recycled golf ball vending machine 100 includes a first transparent clamshell container 114 as exemplified in FIG. 4. In a preferred embodiment, the first transparent clamshell container 114 has a first predetermined number of recycled golf balls 116, such as twelve recycled golf balls, as illustrated in FIGS. 1 and 3, or such as twelve recycled golf balls, as illustrated in FIG. 5.

Referring to FIGS. 1 and 3, the first transparent clamshell container 114 is preferably positioned between the at least two opposing coiled wires 110a, 110b of a first shelf 108a of the plurality of shelves 108.

As illustrated in FIG. 5, the first predetermined number of recycled golf balls 116 comprises a first plurality of different brands 118 (e.g., Titleist, Callaway, MaxFli, and Nike) of recycled golf balls. Through embodiments of the invention disclosed herein, the first plurality of different brands 118 of recycled golf balls are selectable at the option of the user.

In one embodiment, the first plurality of different brands 118 of recycled golf balls includes a first mix of different grade conditions 119 of recycled golf balls; and recycled golf balls have more markings, resulting from more wear and tear, are considered to be in worse condition than recycled golf balls bearing less markings.

In a preferred embodiment, the first transparent clamshell container 114 is preferably a clear plastic square hinged container, as exemplified in FIG. 4. Preferably, the first transparent clamshell container 114 has a cover portion 120 and a tray portion 122 connected by a hinge 124, exemplified in FIGS. 4-5.

Figure 6:
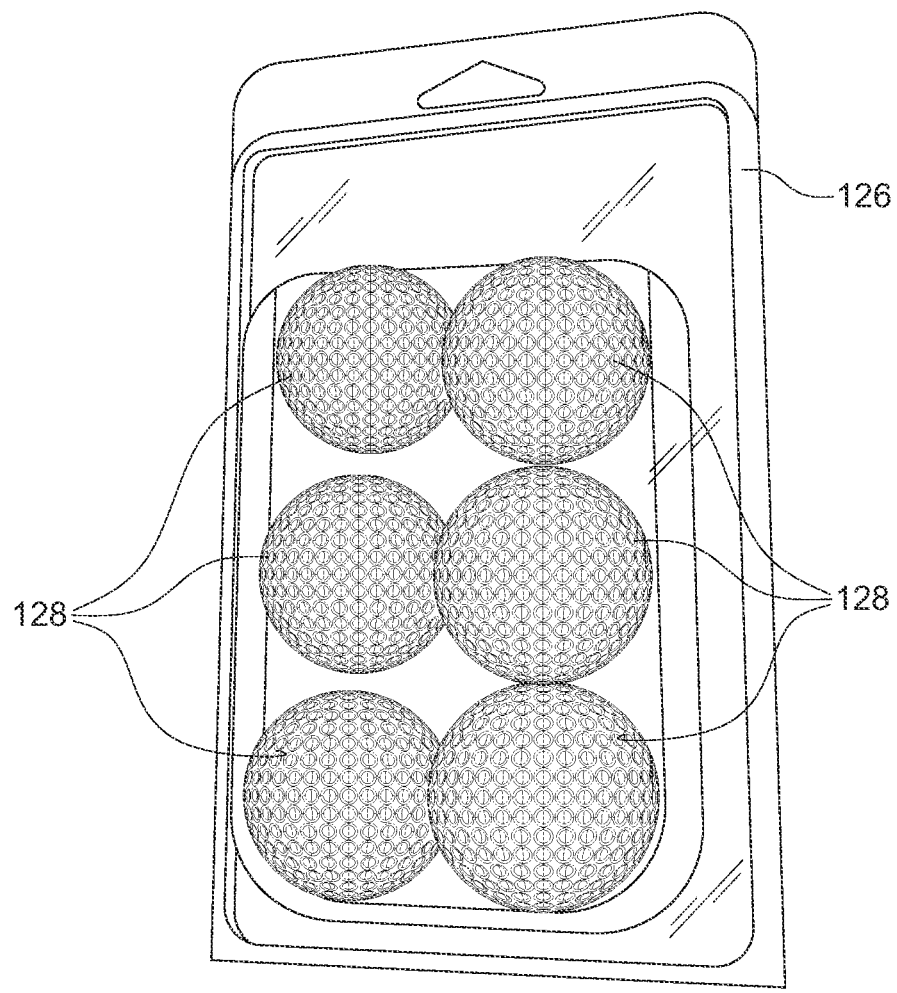
FIG. 6 is a perspective view of a second transparent clamshell container containing a second predetermined number of recycled golf balls, in accordance with embodiments of the invention.

In a preferred embodiment, as illustrated in FIGS. 2-3, the recycled golf ball vending machine 100 includes a second transparent clamshell container 126, as exemplified in FIG. 6, having a second predetermined number of recycled golf balls 128, such as six recycled golf balls.

Referring to FIGS. 1, 3 and 6, preferably, the second transparent clamshell container 126 is positioned between the at least two coiled opposing wires 110c, 110d of a second shelf 108b of the plurality of shelves 108, and the second predetermined number of recycled golf balls 128 (e.g., six) is less than the first predetermined number of recycled golf balls 116 (e.g., 12 or 16).

Figure 7:
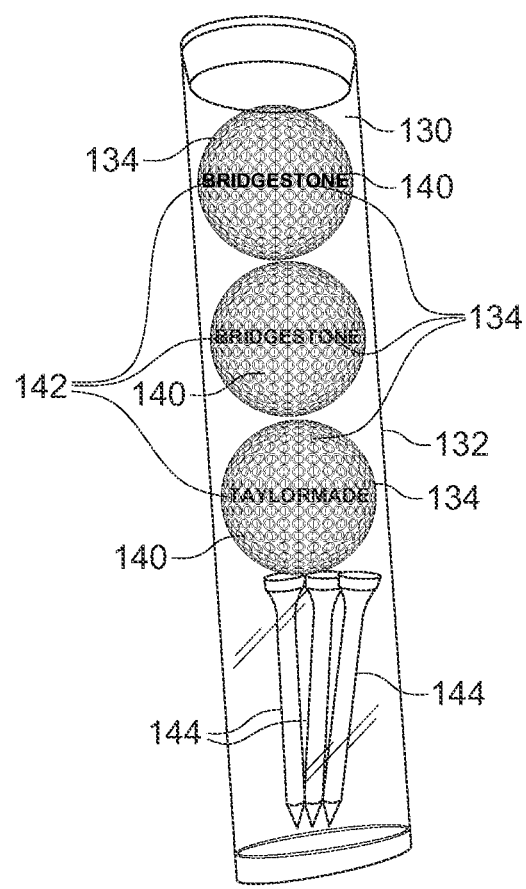
FIG. 7 is perspective view of a first cylindrical container containing a third predetermined number of recycled golf balls and a plurality of golf tees, in accordance with embodiments of the invention.

In one embodiment, as illustrated in FIGS. 2-3, the recycled golf ball vending machine 100 includes at least a first cylindrical container 130, and the first cylindrical container 130 has a transparent cylindrical wall 132 and contains a third predetermined number of recycled golf balls 134 (e.g., three) within the transparent cylindrical wall 132, as exemplified in FIG. 7.

In one embodiment, as shown in FIGS. 2-3, the first cylindrical container 130 is oriented upright between at least two coiled opposing wires 110e, 110f of a third shelf 108c of the plurality of shelves 108. The coiled wires 110e, 110f are adapted to rotate about respective central axis 112e, 112f at the option of the user to horizontally slide the first cylindrical container 130 off the third shelf 108c into the retrieval chamber 106.

In a preferred embodiment, as further illustrated in FIGS. 1 and 3, the first cylindrical container 130 is oriented upright between a single coiled wire 111 of a second shelf 108b of the plurality of shelves 108. The single coiled wire 111 is adapted to rotate about a central axis 113 at the option of the user to horizontally slide the first cylindrical container 130 off the second shelf 108b into the retrieval chamber 106.

Preferably, as illustrated in FIG. 7, the third predetermined number of recycled golf balls 134 comprises a first mix of different grades 140 of condition of recycled golf balls. Through embodiments of the invention disclosed herein, the first mix of different grades 140 of recycled golf balls are selectable at the option of the user.

In one embodiment, the third predetermined number of recycled golf balls 134 (e.g. three) comprises a second plurality of different brands 142 (e.g., Bridgestone, and TaylorMade) of recycled golf balls. Through embodiments of the invention disclosed herein, the second plurality of different brands 142 of recycled golf balls are adapted for selection by a user, and the second plurality of different brands 142 of recycled golf balls is displayed through the transparent cylindrical wall 132. According to one embodiment, the second plurality of different brands 142 (e.g., Bridgestone, and TaylorMade) of recycled golf balls is different from the first plurality of different brands 118 (e.g., Titleist, Callaway, MaxFli, and Nike) of recycled golf balls. In some embodiments, as exemplified in FIG. 7, the first cylindrical container 130 contains a first plurality of golf tees 144 within the transparent cylindrical wall 132.

Figure 8:
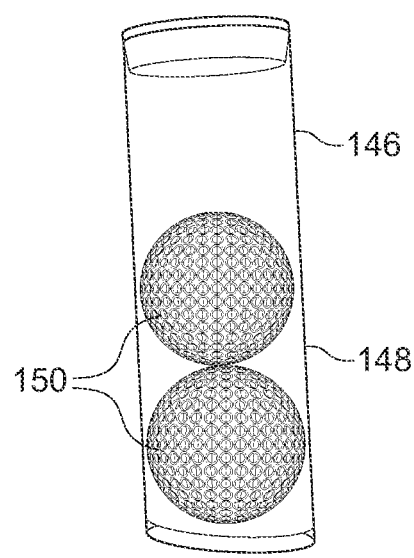
FIG. 8 is a is perspective view of a second cylindrical container containing a fourth predetermined number of recycled golf balls, in accordance with embodiments of the invention.

Additionally, as shown in FIGS. 2-3, the recycled golf ball vending machine 100 includes at least a second cylindrical container 146, as exemplified in FIG. 8, having a transparent cylindrical wall 148 and contains a fourth predetermined number of recycled golf balls 150 (e.g., two) within the transparent cylindrical wall 148. As illustrated in FIGS. 7 and 8, the fourth predetermined number of recycled golf balls 150 (e.g., two) is less than the third predetermined number of recycled golf balls 134 (e.g., three). As illustrated in FIGS. 2 and 3, the second cylindrical container 146 is oriented upright between the two opposing coiled wires 110g, 110h atop the third shelf 108c of the plurality of shelves 108. Also, a rotation of the two opposing coiled wires 110g, 110h about the respective central axis 112g, 112h, at the option of the user, horizontally slides the second cylindrical container 146 off said third shelf 108c into the retrieval chamber 106. In such manner, through embodiment of the invention, the user can view the number of recycled golf balls, the brands of recycled golfs balls, and the conditions of the recycled golf balls, when selecting which recycled gold balls to purchase from the recycled golf ball vending machine 100.

Moreover, as illustrated in FIGS. 2-3, the third shelf 108c includes a first displayed price 152 (e.g., $10) associated with the payment for the first cylindrical container 130 and a second displayed price 154 (e.g., $3) associated with the payment for the second cylindrical container 146. Preferably, the first displayed price 152 has a financial value higher than the second displayed price 154.

According to one embodiment of the invention, the recycled golf ball vending machine 100 further includes a third transparent clamshell container 160, as shown in FIG. 3, having the first predetermined number of recycled golf balls 116, such as the twelve recycled golfs balls illustrated in the third transparent clamshell container 160 in FIG. 3. It is noted that, through embodiments of the invention, the recycled golfs balls of the first transparent clamshell container 114 are in better condition than the recycled golf balls of the third transparent clamshell container 160. Further, the first shelf 108a has a first displayed price 162 (e.g., $20) associated with the payment for the first transparent clamshell container 114 and a second displayed price 164 (e.g., $16) associated with the payment for the third transparent clamshell container 160. Preferably, the first displayed price 162 has a financial value higher than the second displayed price 164, because the recycled golfs balls of the first transparent clamshell container 114 are in better condition than the recycled golf balls of the third transparent clamshell container 160.

As shown in FIG. 3, the third transparent clamshell container 160 is arranged atop the first shelf 108a and is disposed between two opposing coiled wires 110i, 110j. The rotation of the two opposing coiled wires 110i, 110j about the respective central axis 112i, 112j at the option of the user horizontally slides the third transparent clamshell container 160 off said first shelf 108a into the retrieval chamber 106.

Additionally, as illustrated in FIG. 1, the recycled golf ball vending machine 100 includes an instruction mechanism 176 which has a user interface 170 having an input pad 172. The recycled golf ball vending machine 100 also includes a payment mechanism 174 in communication with the user interface 170 to determine a cost of a selected container, for example, the first clamshell container 114, based on a selection of the user. The instruction mechanism 176 is arranged in electronic communication with the payment mechanism 174 and at least two opposing coiled wires 110a, 110b. The instruction mechanism 176 is also arranged in electronic communication with the payment mechanism 174 and the at least single coiled wire 111. In one embodiment, the input pad 172 is a keypad, a touch pad, or a touch screen that allows the user to enter a location of the selected container, for example, the first transparent clamshell container 114, arranged on the plurality of shelves 108. In some implementations, the input pad 172 enables a selection of one or more of the containers 114, 126, 130, 146, 160 stored on the plurality of shelves 108. In one embodiment, the user interface 170 includes a display 178 that displays the location coordinates inserted by user or display a name of the selected container to the user. Also, the display 178 displays a price of the selected container arranged at the location inserted by the user. In one embodiment, the user interface 170 also prompts the user to make the payment via the payment mechanism 174. In one embodiment, the payment mechanism 174 includes one or more processors to process the payment made by the user and a memory to store the pricing information corresponding to each container stored inside the recycled golf ball vending machine 100.

In one embodiment, the payment mechanism 174 facilitates the user to make the payment by one or more payment modes. For example, the payment mechanism 174 facilitates an insertion of coins or notes to make the payment. In some implementations, the payment mechanism 174 facilitates the payment for the selected container through a credit card. The payment mechanism 174, upon receipt of the payment from the user, activates the instruction mechanism 176, which in turn, activates and rotates the two coiled wires, for example, the two coiled wires 110a, 110b when the user selects the first transparent clamshell container 114 about the respective central axis 112a, 112b. In so doing, the selected container, for example, the first clamshell container 114, associated with the two coiled wire 110a, 110b is conveyed horizontally along associated shelf of the plurality of shelves 108 (e.g., 108a, 108b, 108c, 108d, 108e). The two coiled wires 110a, 110b are rotated until the container (e.g. 114) slides over a front edge of the respective shelf and drops into the retrieval chamber 106. Accordingly, the recycled golf ball vending machine 100 is a self-service unit that includes an internal processor, Internet connectivity, and a touch screen monitor (e.g., 172) for customer interaction.

In an exemplary embodiment, a method of retrieving the first transparent clamshell container 114 is disclosed. Upon receipt of the selection of the first clamshell container 114 from the user and corresponding payment from the user, the payment mechanism 174 activates the instruction mechanism 176, which in turn rotates the two coiled wires 110a, 110b about respective central axis 112a, 112b. The two coiled wires 110a, 110b are rotated such that the first transparent clamshell container 114 arranged between the two coiled wires 110a, 110b slides horizontally along the first shelf 108a. The two coiled wires 110a, 110b are rotated until the first transparent clamshell container 114 slides over a front edge 180 of the first shelf 108a into the retrieval chamber 106.

In another example, the user wishes to purchase and retrieve the second transparent clamshell container 126 disposed on the second shelf 108b. For so doing, the user selects the second transparent clamshell container 126 through the user interface 170. In one embodiment, the user inputs location coordinates of the location of the second transparent clamshell container 126 and make a payment using one of the various payment modes provided by the payment mechanism 174. Upon receipt of the payment, the payment mechanism 174 activates the instruction mechanism 176, which in turn rotates the two opposing coiled wires 110c, 110d about respective central axis 112c, 112d. The two opposing coiled wires 110c, 110d are rotated such that the second transparent clamshell container 126 arranged between the two opposing coiled wires 110c, 110d is conveyed horizontally along the second shelf 108b and towards a front edge 182 of the second shelf 108b. The two opposing coiled wires 110c, 110d are rotated until the second transparent clamshell container 126 slides over the front edge 182 of the second shelf 108b into the retrieval chamber 106.

Similarly, the third transparent clamshell container 160, the first cylindrical container 130, or the second cylindrical container 146 can be retrieved from the respective shelves 108a, 108c. Accordingly, when the recycled golf vending machine 100 is activated for retrieving a selected item, such as by insertion of coinage or other form of payment such as by credit card, such activation causes the two coiled wires, for example, the two opposing coiled wires 110, 110b holding the selected item, to rotate about its respective central axis 112a, 112b, resulting the selected item to move forward to the end of associated shelf 108a, 108b, 108c, 108d, 108e and drop free to the bottom retrieval chamber 106 where it is graspable by the purchaser.

Figure 9:
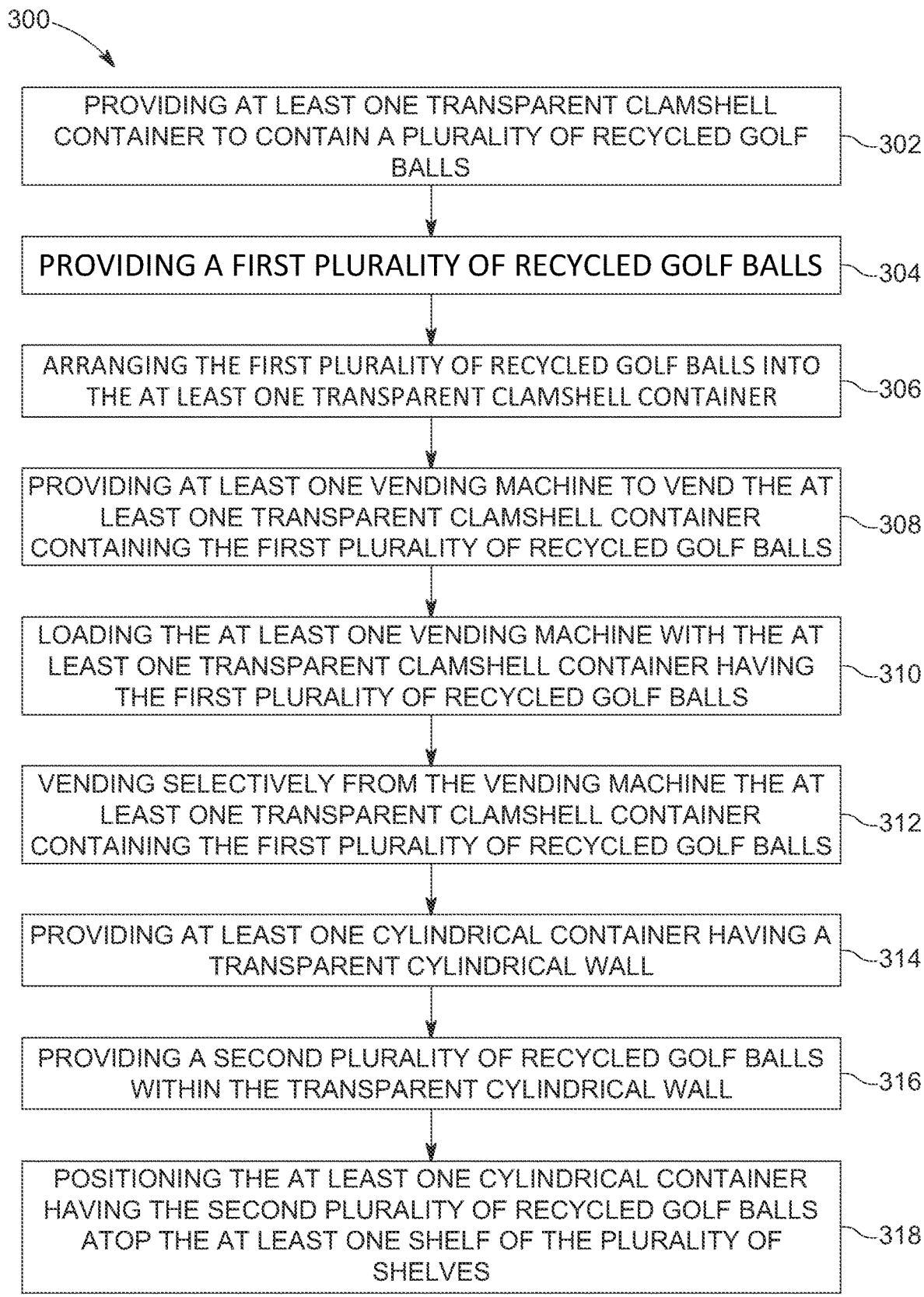
FIG. 9 is an exemplary flow chart illustrating an exemplary method of selling golf balls, in accordance with an embodiment of the invention.

Referring to FIG. 9, in accordance with embodiments of the invention, there is provided a method 300 of selling golf balls. The method 300 includes a step 302 of providing at least one transparent clamshell container, for example, the first transparent clamshell container 114, sized in dimension to contain a plurality of recycled golf balls and includes a step 304 of providing a first plurality of recycled golf balls, for example, the first predetermined number of recycled golf balls 116. In one embodiment, the first plurality of recycled golf balls having, for example, the first predetermined number of recycled golf balls 116 includes a first mix of different brands 118 of recycled golf balls.

In one embodiment, the first plurality of recycled golf balls is obtained by retrieving a plurality of used golf balls from a pond and washing the plurality of used golf balls. Thereafter, the plurality of used golf balls is sorted according to manufacturer. Subsequently the plurality of used golf balls is sorted according to quality. The first plurality of recycled golf balls that have, for example, the first predetermined number of recycled golf balls 116, are obtained from selecting the used golf balls based on the manufacturer such that the first plurality of recycled golf balls includes the first mix of different brands 118 of recycled golf balls.

Thereafter, the method 300 includes a step 306 of arranging the first plurality of recycled golf balls into the at least one transparent clamshell container. For example, the first predetermined number of recycled golf balls 116 are arranged inside the first transparent clamshell container 114 and the second predetermined number of recycled golf balls 128 in the second transparent clamshell container 126.

The method 300 also includes a step 308 of providing at least one vending machine, for example, the recycle golf vending machine 100 to vend the at least one transparent clamshell container, for example, the first transparent clamshell container 114 containing the first predetermined number of recycled golf balls 116, as exemplified in FIG. 9. In one embodiment, the recycled golf vending machine 100 is provided by installing the recycled golf ball vending machine 100 at a retail establishment for commercial sales of recycled golf balls to the public. In one embodiment, the retail establishment includes a public golf course. The small physical footprint of the recycled golf ball vending machine 100 enables it to be placed in a variety of locations. The recycled golf ball vending machine 100 can operate 24 hours a day, 7 days a week, providing instant access to purchasing recycled golf balls on-site. The recycled golf ball vending machines 100 are fully automated; on-site staffing is not required to support customer needs. The recycled golf ball vending machines allow for fast transactions.

After installing the recycled golf ball vending machine 100, the method 300 includes a step 310 of loading the recycle golf ball vending machine 100 with at least one transparent clamshell container (for example, the first transparent clamshell container 114) having the first predetermined number of recycled golf balls 116, and loading the recycle golf ball vending machine 100 with the second transparent clamshell container 126 having the second predetermined number of recycled golf balls 128.

Referring to FIG. 1, in one embodiment, the at least one transparent clamshell container is positioned at atop one of the plurality of shelves 108. For example, the first transparent clamshell container 114 is arranged atop the first shelf 108a and between the two opposing coiled wires 110a, 110b, and the second transparent clamshell container 126 is arranged atop the second shelf 108 and between the opposing coiled wires 110c, 110d. The first transparent clamshell container 114 is arranged between the two opposing coiled wires 110a, 110b such that rotation of the two opposing coiled wire 110a, 110b about their central axes 112a, 112b conveys the first transparent clamshell container 114 horizontally along the first shelf 108a. Similarly, the second transparent clamshell container 126 is arranged between the two opposing coiled wires 110c, 110d such that rotation of the two opposing coiled wire 110c, 110d about their central axes 112c, 112d conveys the second transparent clamshell container 126 horizontally along the first shelf 108b.

Referring to FIG. 9, the method 300 further includes a step 312 of vending, selectively, from the recycled golf ball vending machine 100 the at least one transparent clamshell container, for example, the first transparent clamshell container 114, containing the first plurality of recycled golf balls, for example, the first predetermined number of recycled golf balls 116. For vending the at least one transparent clamshell container such as, for example, the first transparent clamshell container 114, the user activates the recycled golf ball vending machine 100 by inserting a coinage or notes or credit card to make a payment corresponding to a display price of the first transparent clamshell container 114. Upon receipt of the payment, the payment mechanism 174 instructs the instruction mechanism to 176 rotate two opposing coiled wires, for example, the two opposing coiled wires 110a, 110b. Due to the rotation of the two opposing coiled wires 110a, 110b, the first transparent clamshell container 114 moves horizontally along the first shelf 108a. Accordingly, the first transparent clamshell container 114 slides over the front edge 180 of the first shelf 108a and drops into the retrieval chamber 106. Similarly, the user retrieves the second transparent clamshell container 126 from the second shelf 108b or any other transparent clamshell container from the associated shelf.

In one embodiment, referring to FIGS. 1, 2, 7, and 9, the method 300 also includes a step 314 of providing at least one cylindrical container, for example, the first transparent cylindrical container 130 having the transparent cylindrical wall 132 and a step 316 of providing a second plurality of recycled golf balls such as, for example, the third predetermined number of recycled golf balls 134 arranged/disposed within the transparent cylindrical wall 132 of the first transparent cylindrical container 130. In one embodiment, the second plurality of recycled golf balls such as, for example, the third predetermined number of recycled golf balls 134, includes a second mix of different brands 142 of recycled golf balls. The method 300 further includes a step 318 of positioning the at least one cylindrical container containing the second plurality of recycled golf balls atop the at least one shelf of the plurality of shelves. In one embodiment, the first transparent cylindrical container 130 containing the third predetermined number of recycled golf balls 134 is positioned atop third shelf 108c and arranged between the two opposing coiled wires 110e, 110f. In another embodiment, the first transparent cylindrical container 130 containing the third predetermined number of recycled golf balls 134 is positioned atop the second shelf 108b and arranged between the at least single coiled wire 111.

Referring to FIGS. 1-3, for vending the at least one cylindrical container, for example, the first cylindrical container 130, the user activates the recycled golf ball vending machine 100 by inserting a coinage or notes or credit card to make a payment corresponding to a display price 152 of the first transparent cylindrical container 130. Upon receipt of the payment and selection by the user, the payment mechanism 174 instructs the instruction mechanism 176 to rotate two opposing coiled wires, for example, the two opposing coiled wires 110e, 110f. Due to the rotation of the two opposing coiled wires 110e, 110f, the first transparent cylindrical container 130 moves horizontally along the third shelf 108c. Accordingly, the first transparent cylindrical container 130 slides over a front edge 184 of the third shelf 108c and drops into the retrieval chamber 106. In another embodiment, upon receipt of the payment and selection by the user, the payment mechanism 174 instructs the instruction mechanism 176 to rotate the at least single coiled wire, for example, the single coiled wire 111, and due to the rotation the single coiled wire 111, the first transparent cylindrical container 130 moves horizontally along the second shelf 108b. Accordingly, the first transparent cylindrical container 130 slides over a front edge 180 of the second shelf 108b and drops into the retrieval chamber 106. Similarly, the user retrieves the second transparent cylindrical container 146 from the third shelf 108c or any other transparent clamshell container from the associated shelf.

Figure 10:
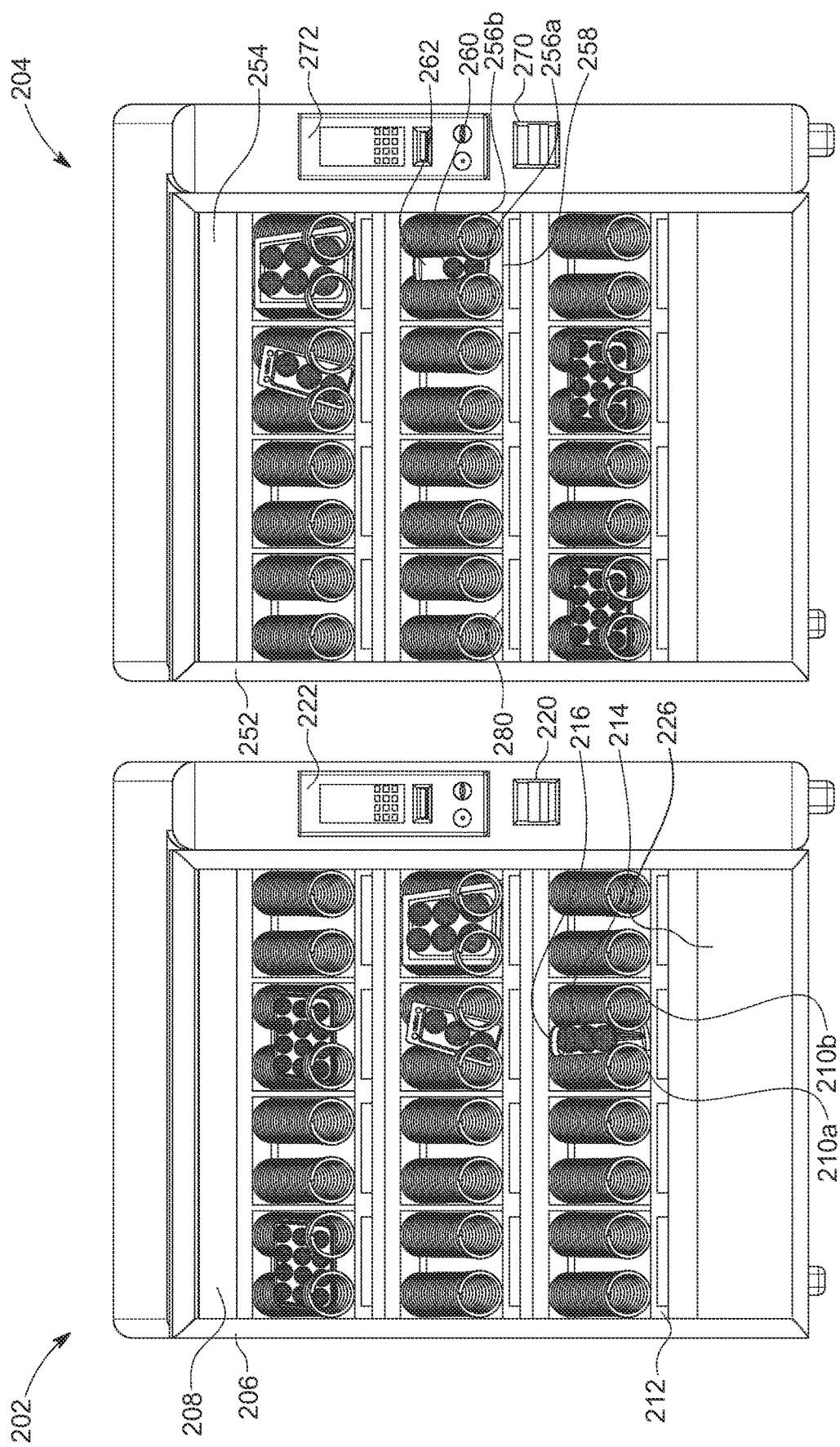
FIG. 10 is front view of an exemplary recycled golf ball vending system having a first recycled golf ball vending machine and a second recycled golf ball vending machine located remotely from the first recycled golf vending machine, in accordance with embodiments of the invention.

Referring to FIG. 10, a recycled golf ball vending system 200 for selling golf equipment, for example, recycled golf balls, to users at a plurality of locations is shown. The system 200 includes a first recycled golf ball vending machine 202 installed at a first location and a second recycled golf ball vending machine 204 arranged/installed at a second location remote from the first location.

Recycled golf ball pricing may vary from one recycled golf ball vending machine to another recycled golf ball vending machine, and may be based on local market conditions. Pricing also varies depending on market elasticity; for example, premiums may be placed on recycled golf balls at private, country club golf courses. Differentiated pricing is preferably used for newer or better condition recycled golf balls versus older or more worn recycled golf balls. In addition, recycled golf ball purchase terms and promotions can vary based on recycled golf ball vending machine locations and the time of week, and preferably can be adjusted remotely on demand via internet connectivity.

As shown, the first recycled golf vending machine 202 of the recycled golf ball vending system 200 has a housing 206 having a front transparent display window 208 and a first pair of opposing coiled wires 210a, 210b positioned above a first shelf 212 disposed within the housing 206. The first pair of opposing coiled wires 210a, 210b is adapted for receiving, storing, and dispensing a first plurality of recycled golf balls 214 from within the first recycled golf ball vending machine 202.

Figure 11:
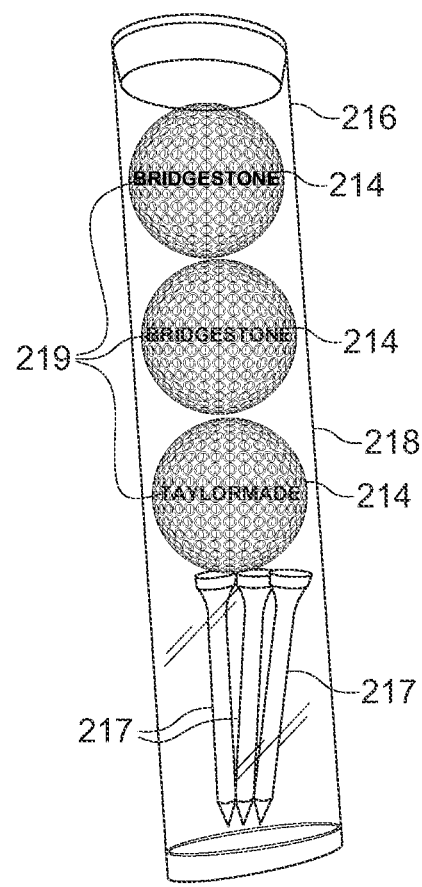
FIG. 11 is a perspective view of an exemplary first cylindrical container containing an exemplary first plurality of recycled golf balls and an exemplary plurality of golf tees, in accordance with embodiments of the invention.

As illustrated, the first recycled golf ball vending machine 202 contains at least a first cylindrical container 216, as exemplified in FIG. 11, having a transparent cylindrical wall 218. The first plurality of recycled golf balls 214 is stored within the transparent cylindrical wall 218. In one embodiment, the first plurality of recycled golf balls 214 has a first mix of different brands 219 of recycled golf balls. Also, the transparent cylindrical wall 218 displays the first mix of different brands 219 of recycled golf balls for selection by the user.

In one embodiment, the first cylindrical container 216 also has a plurality of golf tees 217, along with the first plurality of recycled golf balls 214, stored inside the transparent cylindrical wall 218. In some embodiments, the first cylindrical container 216 has a plurality of sunglasses (not shown), along with the first plurality of recycled golf balls 214, stored inside the transparent cylindrical wall 218.

Also, as illustrated in FIG. 10, the first cylindrical container 216 is stored atop the first shelf 212 between the first pair of opposing coiled wires 210a, 210b and is oriented upright upon the first shelf 212. The first recycled golf ball vending machine 202 includes a first payment mechanism 220 in electronic communication a first instruction mechanism 222. Preferably, the first payment mechanism 220 and the first instruction mechanism 222 are identical to the payment mechanism 174 and the instruction mechanism 176. The first instruction mechanism 222 is also in electronic communication with the first pair of opposing coiled wires 210a, 210b. The first instruction mechanism 222, upon a receipt of payment and instruction by a user, activates the first pair of opposing coiled wires 210a, 210b to rotate. Due to the rotation of the first pair of opposing coiled wires 210a, 210b, the first cylindrical container 216 is conveyed over a front edge 226 of the first shelf 212 to dispense the first plurality of recycled golf balls 214.

As illustrated in FIG. 10, the second recycled golf ball vending machine 204 has a housing 252 having a front transparent display window 254 and a second pair of opposing coiled wires 256a, 256b positioned above a second shelf 258 disposed within the housing 252. The second pair of opposing coiled wires 256a, 256b is adapted for receiving, storing, and dispensing a second plurality of recycled golf balls 260 from within the second recycled golf ball vending machine 204.

Figure 12:
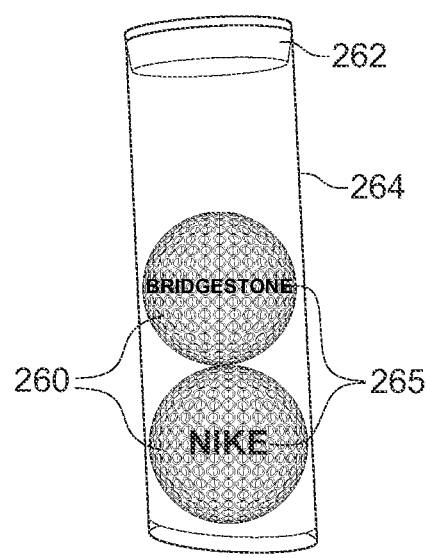
FIG. 12 is a perspective view of an exemplary second cylindrical container containing an exemplary second plurality of recycled golf balls, in accordance with embodiments of the invention.

As illustrated, the second recycled golf ball vending machine 204 contains at least a second cylindrical container 262, as exemplified in FIG. 12, having a transparent cylindrical wall 264. The second plurality of recycled golf balls 260 is stored within the transparent cylindrical wall 264. In one embodiment, the second plurality of recycled golf balls 260 has a second mix of different brands 265, as exemplified in FIG. 12, of recycled golf balls. Also, the transparent cylindrical wall 264 displays the second mix of different brands 265 of recycled golf balls for selection by the user.

Also, the second cylindrical container 262 is stored atop the second shelf 258 between the second pair of opposing coiled wires 256a, 256b and is oriented upright of the second shelf 258. The second recycled golf ball vending machine 204 also includes a second payment mechanism 270 in electronic communication a second instruction mechanism 272. The second payment mechanism 270 and the second instruction mechanism 272 are identical to the payment mechanism 174 and the instruction mechanism 176. The second instruction mechanism 272 is also in electronic communication with the second pair of opposing coiled wires 256a, 256b. The second instruction mechanism 272, upon a receipt of payment and instruction by a user, activates the second pair of opposing coiled wires 256a, 256b to rotate. Due to the rotation of the second pair of opposing coiled wires 256a, 256b, the second cylindrical container 262 is conveyed over a front edge 280 of the second shelf 258 to dispense the second plurality of recycled golf balls 260. In one embodiment, the first recycled golf vending machine 202 and the second recycled golf vending machine 204 are in communication with each other and can also communicate with a central system to provide information about the inventory of golf balls and sales of the golf balls.

The recycled golf ball vending machine system 200 allows low cost inventory management, operations planning, and sales analysis. In a preferred embodiment, the recycled golf ball vending machines 202, 204, 100 are physically designed to meet American Disabilities Act (ADA) specifications so that they may be placed in public facilities. The recycled golf ball vending machines 202, 204, 100 also preferably meet other regulatory requirements of public transportation facilities, public golf courses, private golf courses, universities, and office buildings.

Internet connectivity and a dynamic customer database provide product promotion capabilities and consumer access. Product information and promotions may be tailored to each location's demographics and additionally to each recycled golf ball vending machine's sell-through history. Advertising is available on the front surface of the recycled golf ball vending machine. Advertising with the recycled golf ball vending machine system provides mechanisms to promote specific marketing initiatives, such as marketing different mixes of brands, as well as additional local and global advertising, such as University-brand specific or geographical-brand specific recycled golf balls.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

This invention is susceptible to considerable variation within the spirit and scope of the appended claims.

The claimed invention is:

1. A recycled golf ball vending machine, comprising:
   an upstanding vending machine comprising a housing having a bottom retrieval chamber, the housing comprising a front transparent display window, the upstanding vending machine comprising a plurality of shelves disposed above said retrieval chamber within said housing, wherein each shelf of the plurality of shelves comprises at least two opposing coiled wires disposed above each shelf, each coiled wire of the at least two opposing coiled wires having a respective horizontal axis around which the respective coiled wire is adapted to rotate at the option of a user;
   a first transparent clamshell container comprising a first predetermined number of recycled golf balls, the first clamshell container positioned between the at least two opposing coiled wires of a first shelf of the plurality of shelves, wherein the first predetermined number of recycled golf balls comprises a first plurality of different brands of recycled golf balls;
   a second transparent clamshell container comprising a second predetermined number of recycled golf balls, the second clamshell container positioned between the at least two coiled opposing wires of a second shelf of the plurality of shelves, the second predetermined number of recycled golf balls less than the first predetermined number of recycled golf balls; and
   a payment mechanism in electronic communication with an instruction mechanism, the instruction mechanism in electronic communication with the at least two coiled wires, the payment mechanism adapted to activate the instruction mechanism upon a receipt of a payment by a user, the instruction mechanism adapted to rotate the at least two coiled wires upon a receipt of an instruction by a user, wherein said rotation conveys the first transparent clamshell container or the second clamshell container, at the instruction of the user, horizontally along the respective first shelf or second shelf until said first transparent clamshell container or said second clamshell container slides over a front edge of the respective first shelf or second shelf and drops into the retrieval chamber.

2. The recycled golf ball vending machine of claim 1, further comprising a third transparent clamshell container comprising the first predetermined number of recycled golf balls, wherein the recycled golf balls of the first transparent clamshell are in better condition than the recycled golf balls of the third transparent clamshell container, the first shelf having a first displayed price associated with the payment for the third transparent clamshell container, the first shelf having a second displayed price associated with the payment for the third transparent clamshell container, said first displayed price having a financial value higher than the second displayed price.

3. The recycled golf ball vending machine of claim 1, wherein at least one shelf of the plurality of shelves comprises at least a single coiled wire disposed above the at least one shelf, the single coiled wire having a respective horizontal axis around which the respective single coiled wire is adapted to rotate at the option of a user, the recycled golf ball vending machine further comprising at least a first cylindrical container having a transparent cylindrical wall, the at least first cylindrical container containing a third predetermined number of recycled golf balls and a first plurality of golf tees within said transparent cylindrical wall, said at least first cylindrical container oriented upright between the at least single coiled wire atop the at least one shelf of the plurality of shelves, wherein rotation of the at least single coiled wire at the option of the user horizontally slides said at least first cylindrical container off said shelf into said retrieval chamber.

4. The recycled golf ball vending machine of claim 1, wherein the first plurality of different brands of recycled golf balls is different from the second plurality of different brands of recycled golf balls.

5. The recycled golf ball vending machine of claim 1, wherein the at least first cylindrical container stands upright the first plurality of recycled golf balls, wherein the first plurality of recycled golf balls comprises a first mix of different grade conditions of recycled golf balls, said transparent cylindrical wall displaying said first mix of different grade conditions of recycled golf balls adapted for selection by a user.

6. The recycled golf ball vending machine of claim 1, further comprising at least a first cylindrical container having a transparent cylindrical wall, the at least first cylindrical container containing a third predetermined number of recycled golf balls within said transparent cylindrical wall, said at least first cylindrical container oriented upright between the at least two coiled opposing wires atop a third shelf of the plurality of shelves, wherein rotation of said two opposing coiled wires at the option of the user horizontally slides said at least first cylindrical container off said third shelf into said retrieval chamber.

7. The recycled golf ball vending machine of claim 6, the at least first cylindrical container containing a first plurality of golf tees within said transparent cylindrical wall.

8. The recycled golf ball vending machine of claim 6, wherein the third predetermined number of recycled golf balls comprises a first mix of different grades of condition of recycled golf balls.

9. The recycled golf ball vending machine of claim 8, wherein the third predetermined number of recycled golf balls comprises a second plurality of different brands of recycled golf balls, said transparent cylindrical wall displaying said second plurality of different brands of recycled golf balls adapted for selection by a user.

10. The recycled golf ball vending machine of claim 6, further comprising at least a second cylindrical container having a transparent cylindrical wall, the at least second cylindrical container containing a fourth predetermined number of recycled golf balls within said transparent cylindrical wall, said fourth predetermined number of recycled golf balls less than the third predetermined number of recycled golf balls, said at least second cylindrical container oriented upright between the at least two coiled opposing wires atop the third shelf of the plurality of shelves, wherein rotation of said two opposing coiled wires at the option of the user horizontally slides said at least second cylindrical container off said third shelf into said retrieval chamber.

11. The recycled golf ball vending machine of claim 10, the third shelf having a first displayed price associated with the payment for the at least first cylindrical container, the third shelf having a second displayed price associated with the payment for the at least second cylindrical container, said first displayed price having a financial value higher than the second displayed price.

12. A recycled golf ball vending system for selling golf equipment to users at a plurality of locations, comprising:
a first recycled golf ball vending machine comprising a housing having a front transparent display window, the first recycled golf ball vending machine having a first pair of opposing coiled wires positioned above a first shelf disposed within the housing adapted for receiving, storing, and dispensing a first plurality of recycled golf balls from within the first recycled golf ball vending machine, the first recycled golf ball vending machine containing at least a first cylindrical container having a transparent cylindrical wall, the at least first cylindrical container stored atop the first shelf, the at least first cylindrical container containing the first plurality of recycled golf balls, said first recycled golf ball vending machine comprising a first payment mechanism in electronic communication a first instruction mechanism, the first instruction mechanism in electronic communication with the first pair of opposing coiled wires adapted such that a receipt of payment and instruction by a user activates the first pair of opposing coiled wires to rotate, wherein said rotation conveys the at least first cylindrical container over a front edge of the first shelf to dispense the first plurality of recycled golf balls; and
a second recycled golf ball vending machine comprising a housing having a front transparent display window, the second recycled golf ball vending machine having a second pair of opposing coiled wires positioned above a second shelf disposed within the housing adapted for receiving, storing, and dispensing a second plurality of recycled golf balls from within the second recycled golf ball vending machine, the second recycled golf ball vending machine remote from the first recycled golf ball vending machine, the second recycled golf ball vending machine containing at least a second cylindrical container having a transparent cylindrical wall, the at least second cylindrical container stored atop the second shelf, the at least second cylindrical container containing the second plurality of recycled golf balls, said second recycled golf ball vending machine comprising a second payment mechanism in electronic communication a second instruction mechanism, the second instruction mechanism in electronic communication with the second pair of opposing coiled wires adapted such that a receipt of payment and instruction by a user activates the second pair of opposing coiled wires to rotate, wherein said rotation conveys the at least second cylindrical container over a front edge of the second shelf to dispense the second plurality of recycled golf balls.

13. The recycled golf ball vending system of claim 12, the at least first cylindrical container containing a first plurality of golf tees within said transparent cylindrical wall.

14. The recycled golf ball vending system of claim 12, the at least first cylindrical container containing a pair of sunglasses within said transparent cylindrical wall.

15. The recycled golf ball vending system of claim 12, wherein the at least first cylindrical container stands upright the first plurality of recycled golf balls, wherein the first plurality of recycled golf balls comprises a first mix of different brands of recycled golf balls, said transparent cylindrical wall displaying said first mix of different brands of recycled golf balls adapted for selection by the user.

16. The recycled golf ball vending system of claim 15, wherein the at least second cylindrical container stands upright the second plurality of recycled golf balls, wherein the second plurality of recycled golf balls comprises a second mix of different brands of recycled golf balls, said transparent cylindrical wall displaying said second mix of different brands of recycled golf balls adapted for selection by the user.

17. A method of selling golf balls, comprising:
providing at least one transparent clamshell container sized in dimension and configured to contain a plurality of recycled golf balls;
providing a first plurality of recycled golf balls, said first plurality of recycled golf balls disposed within said at least one transparent clamshell container;
providing at least one vending machine configured to vend the at least one transparent clamshell container containing said first plurality of recycled golf balls, wherein said at least one vending machine comprises a housing having a bottom retrieval chamber, wherein said at least one vending machine comprises a plurality of shelves disposed above said retrieval chamber within said housing, wherein at least one shelf of the plurality of shelves comprises at least two opposing coiled wires configured to rotate at the option of a user, wherein a rotation of the at least two opposing coiled wires conveys the at least one transparent clamshell container horizontally along said at least one shelf until said at least one transparent clamshell container slides over a front edge of the at least one shelf and drops into the retrieval chamber, said at least one vending machine being loaded with said at least one transparent clamshell container containing said first plurality of recycled golf balls;

vending selectively from said vending machine said at least one transparent clamshell container containing said first plurality of recycled golf balls.

18. The method of selling golf balls of claim 17, wherein the step of providing a first plurality of recycled golf balls includes a first step of retrieving a plurality of used golf balls from a pond and includes a second step of washing said plurality of used golf balls.

19. The method of selling golf balls of claim 17, wherein the step of providing a first plurality of recycled golf balls includes a first step of retrieving a plurality of used golf balls from a pond, includes a second step of washing said plurality of used golf balls, includes a third step of sorting the plurality of used golf balls according to manufacturer, and includes a fourth step of sorting the plurality of used golf balls according to quality.

20. The method of selling golf balls of claim 17, wherein said step of providing at least one vending machine configured to vend the at least one transparent clamshell container containing said first plurality of recycled golf balls comprises installing said at least one vending machine at a retail establishment wherein said at least one vending machine is adapted for commercial sales of recycled golf balls to the public.

21. The method of selling golf balls of claim 17, wherein said step of providing at least one vending machine configured to vend the at least one transparent clamshell container containing said recycled golf balls comprises installing said at least one vending machine at a public golf course, wherein said at least one vending machine is adapted for commercial sales of recycled golf balls to the public.

22. The method of selling golf balls of claim 17, wherein the step of providing a first plurality of recycled golf balls includes providing a first mix of different brands of recycled golf balls.

23. The method of selling golf balls of claim 17, further comprising a step of providing at least one cylindrical container having a transparent cylindrical wall, and further comprising a step of providing a second plurality of recycled golf balls disposed within the transparent cylindrical wall of the at least one cylindrical container, wherein said at least one transparent cylindrical container is positioned atop the at least one shelf of the plurality of shelves, said at least one transparent cylindrical container positioned between the at least two opposing coiled wires, wherein rotation of the at least two opposing coiled wires conveys the at least one transparent cylindrical container horizontally along said at least one shelf until said at least one transparent cylindrical slides over a front edge of the at least one shelf and drops into the retrieval chamber.

24. The method of selling golf balls of claim 23, wherein the step of providing a second plurality of recycled golf balls includes providing a second mix of different brands of recycled golf balls.

* * * * *